United States Patent [19]

Martin

[11] 4,359,732

[45] Nov. 16, 1982

[54] TOPOGRAPHICAL MAPPING RADAR

[75] Inventor: Gregory L. Martin, Phoenix, Ariz.

[73] Assignee: Goodyear Aerospace Corporation, Akron, Ohio

[21] Appl. No.: 326,321

[22] Filed: Nov. 21, 1963

[51] Int. Cl.³ .............................................. G01S 13/89
[52] U.S. Cl. .............................. 343/5 CM; 343/5 PC; 343/16 M
[58] Field of Search ............. 343/5 PR, 5 ST, 6, 6 A, 343/7 TA, 7.9, 16, 16.1, 5 PC, 16 M, 5 CM

[56] References Cited

U.S. PATENT DOCUMENTS

| | | | |
|---|---|---|---|
| 3,007,155 | 10/1961 | Petrides ......................... | 343/5 PC X |
| 3,025,517 | 3/1962 | Watson et al. ................... | 343/16 M |
| 3,078,455 | 2/1963 | Brainin ........................... | 343/6 R X |
| 3,106,708 | 10/1963 | Sletten ............................ | 343/16 R |
| 3,129,422 | 4/1964 | Fox ................................. | 343/5 PC X |
| 3,140,482 | 7/1964 | Duncan et al. ................... | 343/6 R |
| 3,153,784 | 10/1964 | Petrides et al. ................. | 343/5 PC X |
| 3,155,964 | 11/1964 | Voles ............................. | 343/5 PC X |

Primary Examiner—T. H. Tubbesing

Attorney, Agent, or Firm—P. E. Milliken; E. W. Oldham; R. L. Weber

EXEMPLARY CLAIM

1. In a terrain contour mapping system in an aircraft, the combination of
   a dipole radar antenna consisting of two vertically spaced fan beam antenna poles mounted on the aircraft,
   means to transmit radar signals at a depressed angle from the antenna in directions normal to the flight path of the aircraft,
   means to measure and record the phase difference in the radar signals received at the two poles of the antenna when the signals are reflected from the earth,
   an inertial system to measure and record airborne platform orientation and position,
   means to combine the orientation and position information with the recorded radar information, and
   ground stationed means adapted to receive the combined information to provide a three coordinate output signal which determines points on a map representing the contour of the terrain flown over by the aircraft.

9 Claims, 8 Drawing Figures

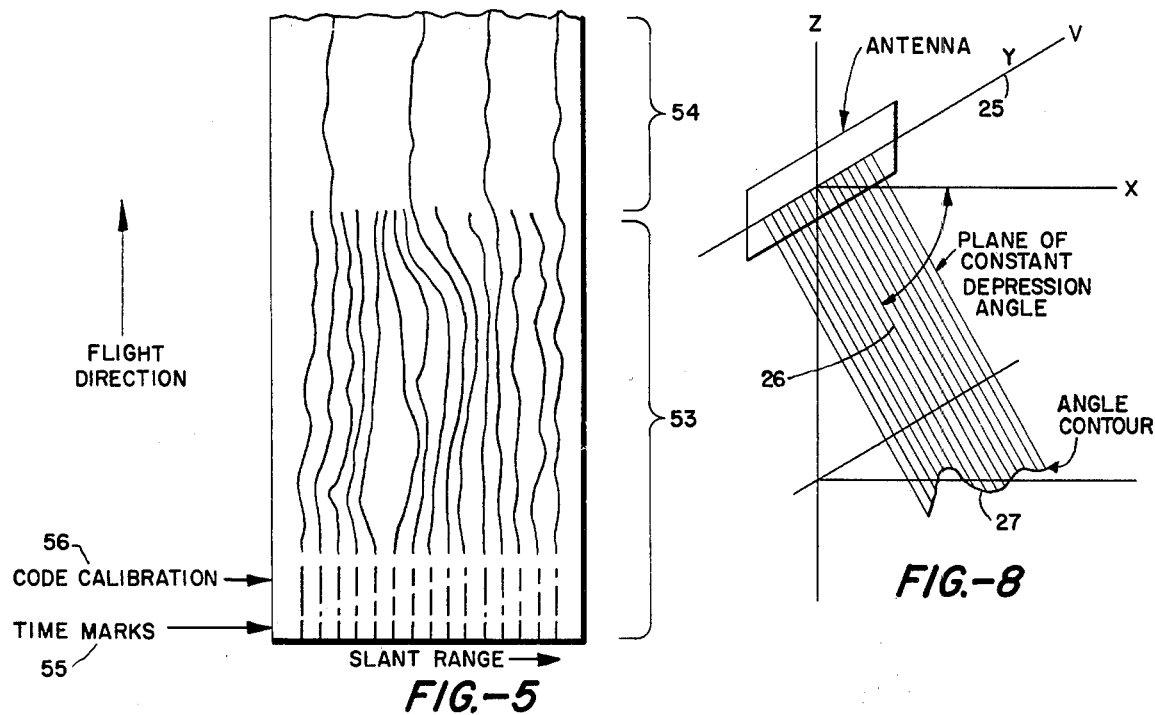
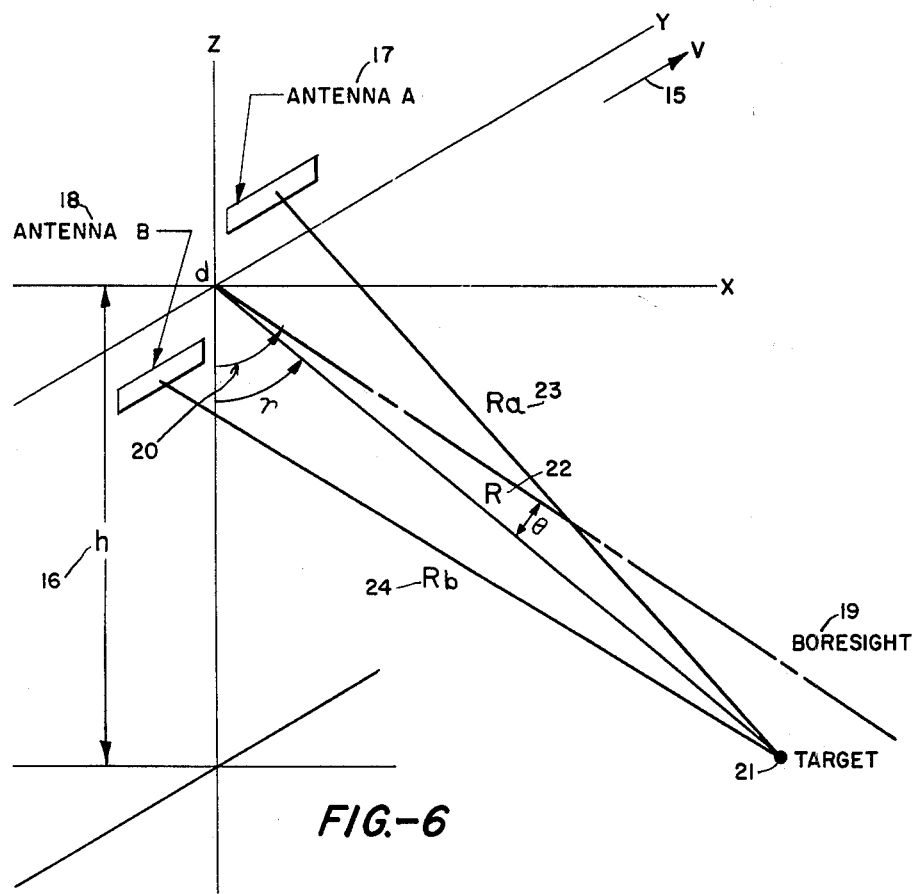

TOPOGRAPHICAL MAPPING RADAR

The Government has rights in this invention pursuant to contract No. DA-44-009-ENG-3817 awarded by U.S. Army Engineer Research and Development Laboratories.

This invention relates to a topographical mapping radar system, and more particularly to a coherent doppler monopulse terrain elevation radar system which utilizes a dipole antenna to transmit monopulse radar signals in combination with an inertial platform system to determine three absolute points in space representing X, Y, and altitude coordinates of each reflected radar signal to thereby provide information representing the contour of the terrain scanned by the radar signal.

Heretofore it has been known that there are many systems to determine the contour of the earth's terrain. These include among others surveying on land, photographs and means to interpret photographs to establish terrain contour features. However, a new process is needed because surveying and photographic techniques cannot be used in darkness and inclement weather. Further, both these methods involve considerable time and expense to perform, and thus are not adaptable to present fast moving military strategic concepts.

Systems utilizing fan-beam coherent doppler radar, and conical beam coherent doppler radar to locate a point in space as the coordinate of three measurements, namely X, Y, and altitude, have been attempted with some degree of success in topographical contour matching systems. However, these systems are open to the objections of mimimum range, serious velocity ambiguity problems, and the limitation of inefficient use of antenna aperture.

It is the general object of the present invention to avoid and overcome the foregoing and other difficulties of prior art practices by the provision of a topographical contour mapping system which utilizes two vertically spaced fan-beam antennas and a transmitted radar signal on an aircraft with inertial stabilization to achieve quickly, easily, and inexpensively, information necessary to achieve topographical contour data to provide a contour map or display.

A further object of the invention is to provide a topographical contour radar mapping system which provides excellent topographical contour information, and which can utilize a medium-frequency, large antenna mounted on a high flying, lower speed aircraft to provide a wide strip-map.

A further object of the invention is to provide a topographical contour mapping system which can utilize a high frequency small antenna mounted on a low flying high speed aircraft to obtain a narrow strip-map.

Another object of the invention is to provide a topographical contour mapping system which utilizes an aircraft mounted radar antenna in conjunction with an aircraft inertial platform stabilization apparatus to achieve radar information which can be processed in ground positioned computing equipment to achieve a contour strip map or display of the strip of terrain flown over by the aircraft while the system was energized.

A further object of the invention is to provide a topographical contour mapping system which is essentially automatic, easy to operate, reliable, and which provides highly accurate contour information rapidly.

The aforesaid objects of the invention and other objects which will become apparent as the description proceeds are achieved by providing in an airborne terrain contour mapping system the combination of an aircraft, a dipole radar antenna mounted on the aircraft, means to transmit monopulse radar signals at a depressed angle between 20 to 45 degrees from the antenna at angles normal to the flight path of the aircraft, means to measure and record the phase difference in the radar signals received at the two poles of the antenna when the signals are reflected from the earth, an inertial system to measure and record airborne platform orientation and position, and ground stationed means to combine the reflected radar signal recorded information with the aircraft orientation and position recorded information to provide the information necessary to map the contour of the terrain flown over by the aircraft.

For a better understanding of the invention reference should be had to the accompanying drawings, wherein:

FIG. 5 is an illustration of a typical angle contour data film based on flight direction and slant range; and illustrating a method to time and code calibrate the data film;

FIG. 6 is a geometrical configuration of the angle contour system showing the relationship between the two vertically spaced fan beam antennas for a specific target;

FIG. 8 is a diagrammatic illustration indicating how the angle contour lines are recorded by the radar pulses.

In discussing the system requirements of any airborne mapping system, it should be recalled that the basic sensor, in this case a radar, can do no more than measure the coordinates of terrain elements with respect to the vehicle that carries it. In this case the vehicle is an aircraft and more specifically is the platform on which the antenna is mounted. The position and orientation of the platform must be known with respect to some datum more accurately than the accuracy of the measurement sensor being used.

The function of the airborne mapping system is the same as that of a survey team. Each point in the terrain must be located as accurately as if a transit were set up every hundred or so feet along the flight path, levelled, north-oriented, and positioned accurately by chain or solar measurements. Thus, we see that in antenna platform carried by the aircraft is equivalent to the extremely stable platform represented by the surveryor's transit base.

The strip-mapping radar system, to be described hereinafter, measures the range and the depression angle to a number of recognizable features lying along a straight line normal to the flight path of the aircraft by utilizing a dipole antenna and a transmitted monopulse radar signal. In order to accurately orient the mounting platform with respect to some datum, an accurate, highly refined inertial navigation and stabilization system is provided. Unfortunately, the inertial system in its present state of development and in the foreseeable future has one deficiency for this purpose. All inertial systems are divergent in the vertical directions so that altitude information must be supplied independently. Summarizing then, the airborne radar mapping system to be described hereinafter, divides naturally into (1) measuring the position orientation of the airborne platform with respect to a datum at all times, and (2) measuring the position of points in the terrain with respect to the airborne platform.

Ideally, more reliable data will result if airborne measurements are recorded in their most fundamental form, which would mean that only basic radar information, such as receiver signal amplitude, phase, and antenna position would be recorded as functions of time. However, the present state of recording techniques will not permit the accurate recording of such tremendous amounts of data and, therefore, some airborne integration is necessary. Further, it would be desirable to record the coordinates of every resolvable element in the mapped area. A gain, practical limitations in the weight of airborne recording equipment requires that some sampling of terrain be performed. This, in turn, requires some interpolation to the ground-base data processing, but there is no significant loss in accuracy thereby.

Figure 1:
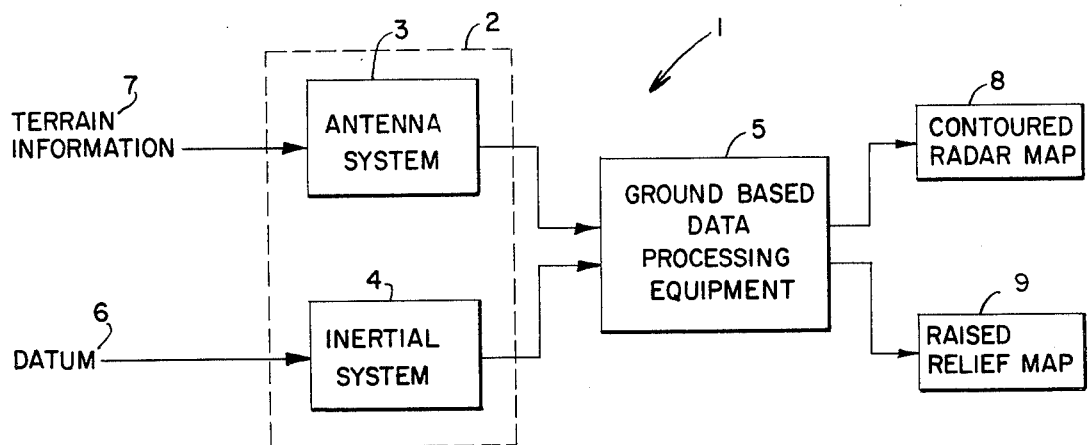
FIG. 1 is a block diagram of the general components of my new system showing information flow throughout the proposed system.

A very basic block diagram of a complete mapping system is shown in FIG. 1. The system, indicated generally by numeral 1, divides naturally into two parts, namely, the airborne based system, indicated by a dotted block 2 which includes an antenna system 3 and an inertial system 4, and ground-based data processing equipment, indicated by numeral 5. In the airborne system 2, the inertial system 4 is used to measure and record airborne platform orientation and position, and the antenna system 3 is used to measure and record the reflected radar signals significant of positions of points on the terrain with respect to the aircraft. Datum information 6 is the input to the inertial system 4 while terrain information 7 is the input to the antenna system 3. The outputs from the ground-based data processing equipment 5 are utilized to achieve a contoured radar map 8 and a raised relief map 9. The system can also contain mechanism to provide in-flight calibration of the airborne radar to eliminate errors due to long-term drifts and thereby maintain the aircraft flight coordinates.

MONOPULSE RADAR PRINCIPLES

Monopulse radars send out a single pulse and utilize the phase difference between the reflected return signal received at two antennas separated in a vertical plane to locate a target within the antenna beam. The monopulse or interferometer principle can be used to measure the vertical angle to targets from an airborne radar which utilizes a narrow azimuth beam so that signals from only a small area arrive at the antenna at any one instant of time. The basic principle of monopulse utilizes the interferometer equation to determine the angle of arrival at the antennas.

Figure 2:
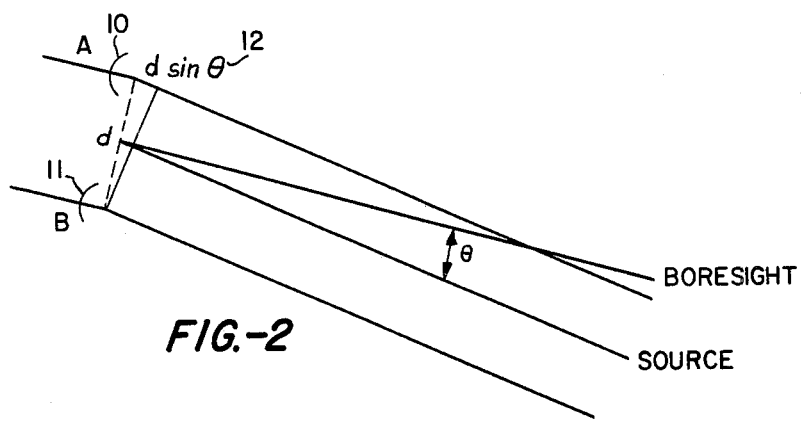
FIG. 2 is a diagrammatic illustration of phase measurement means utilizing two vertically spaced fan beam antennas with a transmitted radar signal.

Thus, with reference to FIG. 2, it is seen that when a plane wave is impinged on the monopulse antennas, A and B, indicated by numerals 10 and 11, respectively, there is a path difference of d sin $\theta$ indicated by numeral 12; where d=antenna separation; $\theta$=the angle between a line to the target and the boresight; and, $\lambda$=the pulse wave length. When this path difference is converted into phase, the phase relation is phase $$\phi = \frac{2\pi d}{\lambda} \sin \theta.$$

Since each $\pi$ radians interval of phase $\phi$ has the same properties, ambiguities in phase and in angle of arrival exist. Each $\pi$ radians interval is ambiguous with all other $\pi$ radians intervals. In essence, the interferometer can measure phase over a range of $\pm 2\pi$ radians. Thus, this sets a limit on the size of the angle of arrival $\theta$.

The use of doppler sharpening techniques for increased azimuth resolution of the monopulse signal will be explained with reference to FIG. 6. Consider an airborne pulsed monopulse-doppler system in flight as shown in FIG. 6 at velocity V indicated by arrow 15 and altitude h indicated by arrow 16. The two antennas A and B indicated by numerals 17 and 18 respectively, are mounted on the aircraft and are tilted to depress the boresight 19 and make an angle 20 with the vertical. A point target 21 within the radar beam on boresight 19 is located at a distance R indicated by numeral 22 from the midpoint of the line between the two antennas 17 and 18. $R_a$ indicated by numeral 23 and $R_b$ indicated by numeral 24 indicate slant range from their respective antennas to the target. In operation, antenna A indicated by numeral 17 will transmit a pulse of a certain form. Theoretically, the pulse modulation will allow slant range determination to one-half the pulse width. The return signals reaching the two antennas 17 and 18 from target 21 are out of phase as indicated with the explanation in reference to FIG. 2. To utilize this phase difference, a delay-line integrator to be described later is utilized to effect the summing of successive pulses as a function of time. A time reference is chosen so that it can be determined with reference to time when the aircraft is at the point of closest approach to the target 21. It is this dependance of range on time that introduces doppler phase change from pulse to pulse. The difference between the two signals received at antennas A and B indicated by numerals 17 and 18 is a phase difference signal containing depression-angle information. Therefore, in the manner described above doppler beam sharpening techniques to increase resolution azimuth can be utilized in the system which techniques will only enhance the value of information received by the radar.

CONSTANT ANGLE CONTOUR MAPPING SYSTEM

The radar returns from all targets that exhibit a given phase difference, when received on a pair of vertically stacked monopulse antennas and when the transmitted horizontal beam width is narrow, lie in a vertical plane. This plane is formed by a horizontal line normal to the flight path indicated in FIG. 8 by numeral 25 and a constant-depression-angle boresight line 26 related to the phase difference of the two antennas. The intersection of this plane with the earth, indicated by numeral 27 forms one point on a constant-depression-angle contour line. A plurality of these lines describe a number of points and form a constant-depression-angle contour line, all as indicated in FIG. 8. If specific phase differences are detected corresponding to specific depression angles, families of angle contour lines are generated. These lines may be recorded resulting in a constant-depression-angle contour data film.

AIRBORNE EQUIPMENT SYSTEM DESCRIPTION

Figure 3A:
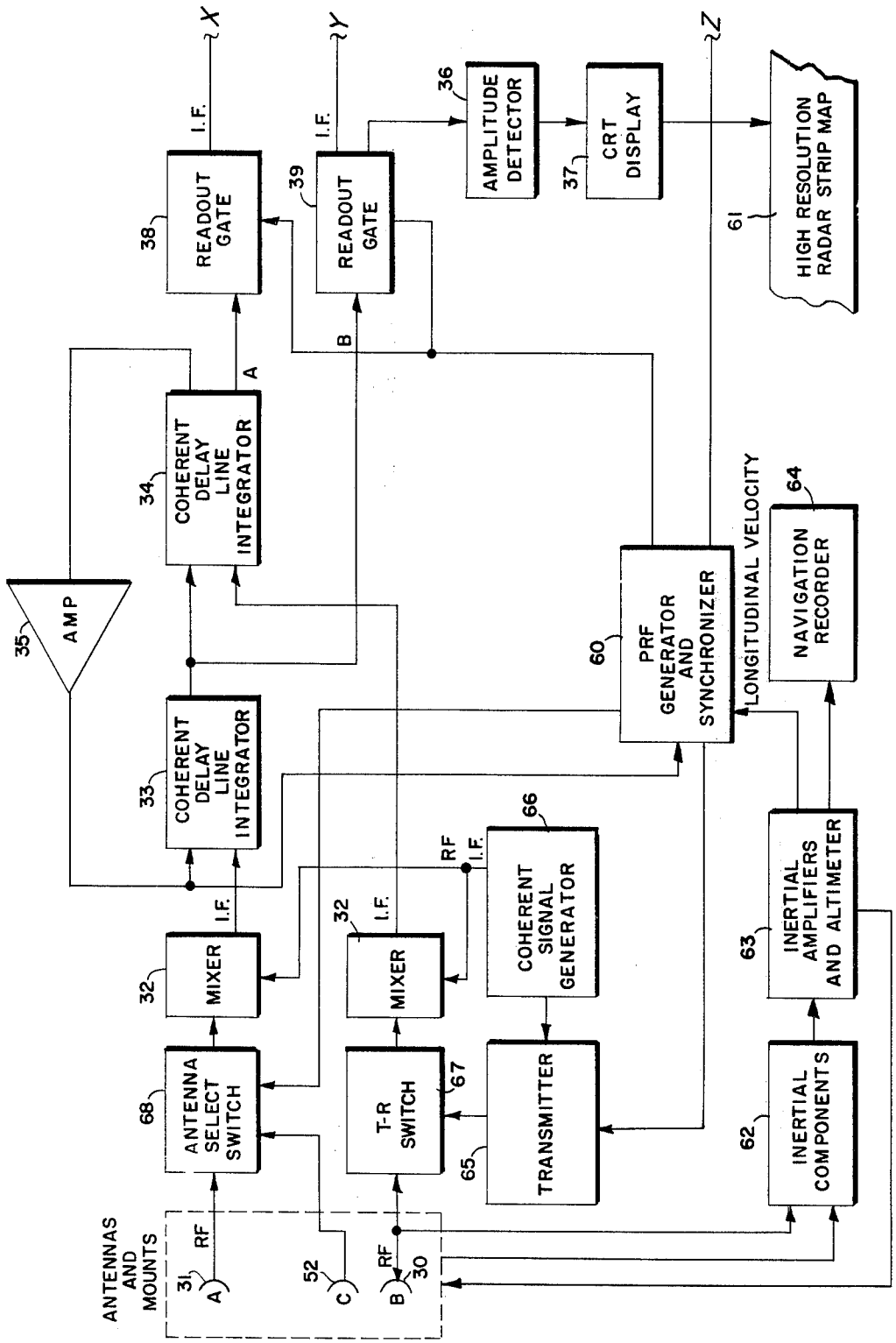
FIGS. 3a and 3b are a detailed block diagram of suitable apparatus utilized for the airborne portion of the system.
Figure 3B:
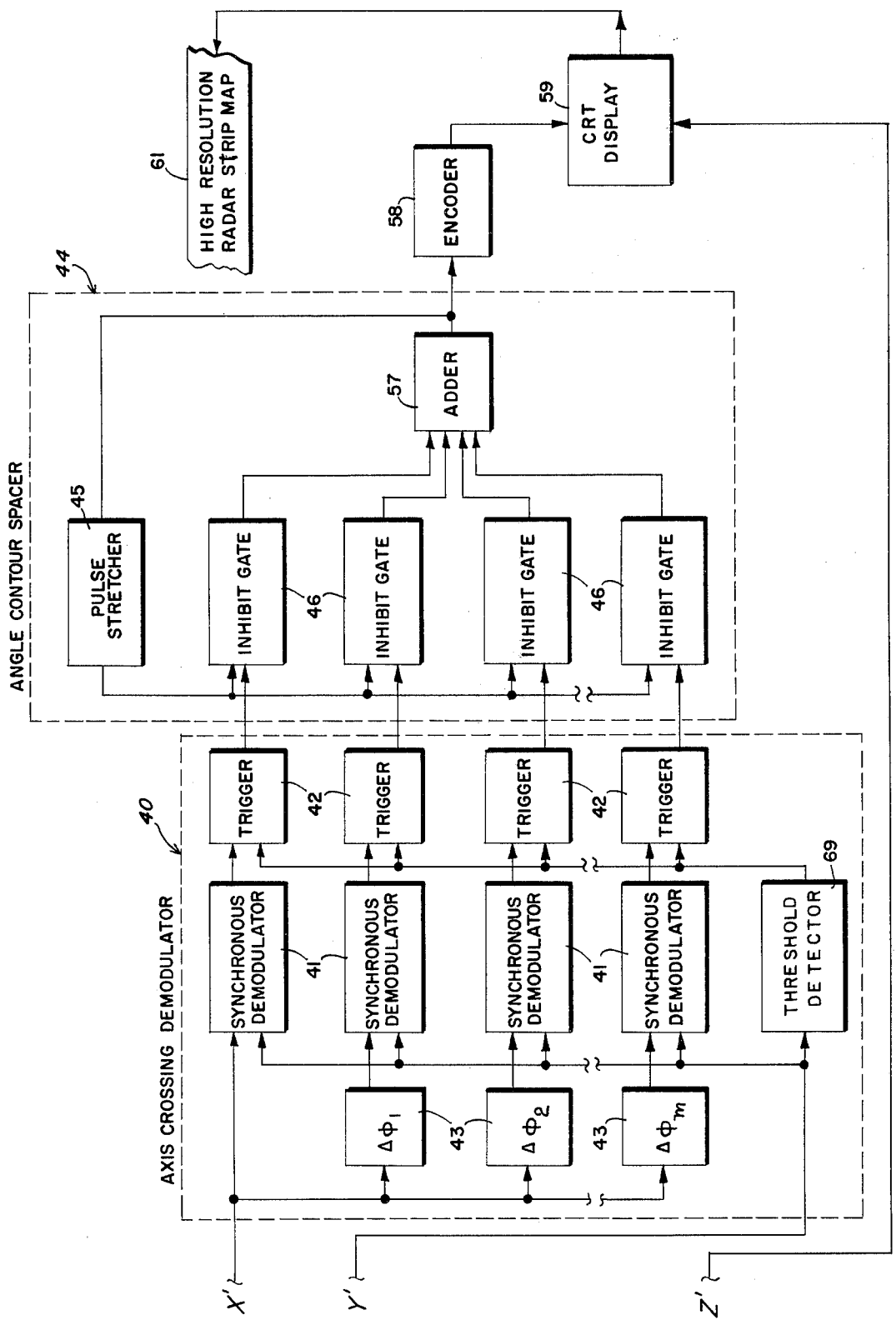

An airborne system capable of providing a constant-depression-angle contour data film has been defined in terms of block diagram and is shown in FIGS. 3a and 3b. In this instance, the energy is transmitted from antenna B indicated by nuneral 30, and the return energy is received at both antennas A, indicated by numeral 31, and the antenna B, 30. The returns are converted to I.F. in the mixers 32, before being integrated in the coherent delay-line integrators 33 and 34. The two delay lines resultant from the delay line integrators 33 and 34 are of the recirculating type where the delay time is equal to the transmitter pulse.

The output pulse from delay line integrator 34 is fed back through amplifier 35 as an input to delay integrator 33 in phase with the return information received from the next subsequent radar pulse. This process is continuous with all frequencies integrating to zero except zero doppler, which builds up in amplitude. This circuit functions to improve azimuth resolution, while at the same time increasing signal strength and the signal to noise ratio. A high-resolution strip map may be obtained by amplitude detection, in amplitude detector 36, from either output of the delay lines of delay line integrators 33 and 34 and displaying the same on CRT display 37.

It should be noted however that this is merely initial strip map information without contour usually used to detect if the equipment is functioning properly to this point in the system. Naturally, this map will better show targets that might be covered by the contour lines added later. A better resolved strip map adapted to provide contour information of high resolution is produced by associated equipment more fully described hereinafter.

The phase of the two delay-line output signals may be compared to obtain depression-angle information. The delay-line outputs are fed into readout gates 38 and 39 respectively, and from there into the axis crossing detector, indicated generally by the dotted block 40. The axis crossing detector contains a plurality of synchronous demodulators 41, which detect the phase difference between signals from the readout gates 38 and 39 sequentially, and provide resulting output signals that take the form of synchronous sine curves which are displaced from each other in time phase. A plurality of associative trigger circuits 42 are provided to respond with an output pulse each time the sine wave from its associative synchronous demodulator 41 crosses the X axis. The pulses from the trigger circuits 42 modulate the beam of the CRT display 59 by writing a dot which is a portion of a particular angle contour line.

A pulse will be generated every $\pi$ radians by one of the trigger circuits 42. Separation of the pulses correspond to approximately a one-degree change in depression angle, depending on the system parameters. To give a map of sufficient width, there will be approximately 25 such signals.

The combination of one synchronous demodulator 41 and its associative trigger 42 comprises a channel. If this channel puts out signals only one degree apart in depression angle there will not be sufficient information available to describe the terrain, especially when measured from over 40,000 feet altitude. Therefore, additional channels have been added. In FIGS. 3a and 3b only four channels are indicated, but the invention contemplates that between 10 to 20 channels will be used, with the exact number being added to fill the interval between the major angle contours to insure adequate terrain information. Each channel after the first is provided with a fixed phase shifter 43 which provide phase shifts increasing progressively in increments to divide each phase interval into equal parts. Thus, the outputs of each channel will provide equally spaced angle contours for a given range of depression angles.

It is not desirable for angle contour lines to fall on or so near others that they cannot be distinguished as two. To prevent a pile-up of lines, an angle contour spacer, indicated generally by dotted block 44, is provided. The spacer 44 includes a pulse stretcher 45, and a plurality of inhibit gates 46 associated with each channel. The inhibit gates 46 delay momentarily all channels for a period of time after a pulse has been written on the data film. The period of time is just long enough to give two adjacent angle contour lines enough separation to be distinguishable as two lines.

Figure 4:
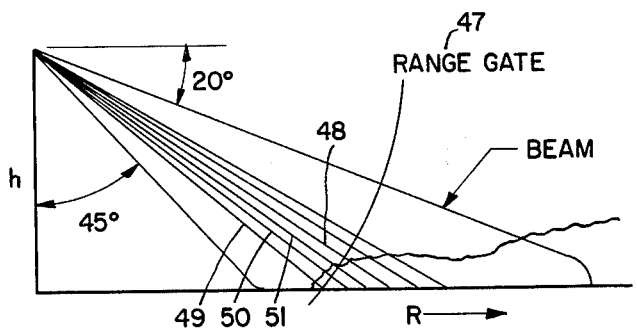
FIG. 4 is a graphical illustration showing the depression angles available and the relationship between range gate and antenna spacing.

A means must be provided for positive angle contour line identification. The problem is that the angle associated with the first angle contour line is not known. With reference to FIG. 4, it can be seen that if the receiver is gated on at a time corresponding to the range gate 47, that when the terrain is not level the fourth line indicated by numeral 48 is the first angle contour line that is presented on the data film since the range gate 47 actually falls below the terrain level for lines one through three, indicated generally by numerals 49 through 51 respectively. Therefore, lines 49 through 51 will not gate and do not provide a contour line. For flat terrain the number one line, indicated by numeral 49 would be the first line written on the data film. For positive identification a prior knowledge of the terrain is required.

The angular separation of the lines 48 through 51 in FIG. 4 is inversely proportional to the antenna separation. If the antenna separation is reduced sufficiently, the whole strip-map width could be divided into possibly only two or three lines. If this system were used, it would be easy to identify each line because of the large angular separation of the angle contours, so that only a mimimum of previous knowledge about the terrain would be required. Thus, in normal operation antennas A and B, indicated by numerals 30 and 31 in FIG. 3a, would be used so that many angle contour lines would be written. However, after several miles of travel, antenna C, indicated by numeral 52 in FIG. 3, would be switched in and antenna A indicated by numeral 31 would be switched out. An appropriate programmed pulse from a PRF generator and synchronizer 60 might be applied to an antenna select switch 68 for this purpose. Since the spacing between antenna C (52), and antenna B (30) is quite small, this would result in the large spacing in the angle contour lines. A typical angle contour data film might appear as indicated in FIG. 5, wherein the large antenna spacing angle contour lines are represented by the portion indicated generally by numeral 53, and the small antenna spacing portion is indicated generally by numeral 54. Thus, in the area indicated by 54 where only four lines appear, positive identification is easily obtained. This in turn positively identifies four lines in the region indicated by numeral 53, which in turn makes all lines in section 53 identifible by counting techniques. Note again, that the strip map is written on the parameters of slant range and flight direction.

CALIBRATION

Before beginning the run for each map and periodically thereafter, some calibrations must be recorded on the data film. The two major calibrations are time and phase calibration and coding for identification of the angle contours.

Time calibration is required because the range sweep will be at least slightly non-linear. Calibration can be accomplished by writing a line of dots that are equally spaced in time on the data film. The time calibrations as indicated generally by numeral 55 in FIG. 5, will be equally spaced if the sweep is linear, and unequally spaced if the sweep is non-linear. Ground-based equipment will be used to correct the angle contour data film for range sweep non-linearities using the line calibration.

Constant angle contour coding is necessary to further identify each angle contour line. Identification is necessiated by the fact that a single inhibitor (not shown) is used to drop out some angle contour lines when they fall very close together. The constant angle contour coding calibration lines, indicated by numeral 56 in FIG. 5, can be recorded on the data film by driving the two radar channels with signals that have a phase difference proportional to range. The coding is accomplished by blanking one line at a time in different regions to provide a plurality of different segments, as indicated in FIG. 5. This information can then be decoded by the ground based decoding equipment.

OUTPUT RESULTANT

With reference to FIGS. 3a and 3b it is seen that the outputs of the angle contours spacer section 44 provide inputs to an adder 57 which in turn feeds an encoder 58 which performs the time mark and code calibration on the strip signal, as described above with reference to FIG. 5. Of course, the adder 57 is a well known component and merely collects the plurality of input signals together into one composite signal which is appropriately acted upon by the encoder 58. The signal from the encoder 58 is sent to the CRT display 59 where the resultant signal is combined with a signal from a substantially conventional PRF generator and synchronizer 60 to provide the final output of the airborne system which is the high resolution radar strip map 61. The usual method for producing the strip map from the radar display is by photographic techniques, although other suitable techniques could be used. In the usual manner the generator and synchronizer 60 sends drive pulses to a transmitter 65 to effect time synchronization of the return information display on the CRT display 59. Note that the generator and synchronizer 60 receives inputs from the inertial components 62 and the inertial amplifiers and altimeter 63 so that proper position information is inserted into the strip map 61. Also, the recirculated signal from the amplifier 35 is directed as an input to the PRF generator and synchronizer 60 to insure proper phase delay coordination in the delay line integrators 33 and 34. The inertial components section 62 and inertial amplifiers and altimeter 63 also provide information to properly position the antennas, and further are recorded by the navigation recorder 64.

To complete the antenna transmitting equipment, a transmitter 65 and a coherent signal generator 66 are provided, which operate through a TR switch 67 to send the transmitting pulse to antenna B(30). An antenna select switch 68 controls the selection between antenna A indicated by numeral 31, and antenna C, indicated by numeral 52, to control angle contour line spacing as described previously. A threshold detector 69 is provided in the axis crossing detector 40 to insure proper threshold levels of the signal pulses in the conventional manner.

GROUND-BASED DATA-REDUCTION EQUIPMENT

Figure 7:
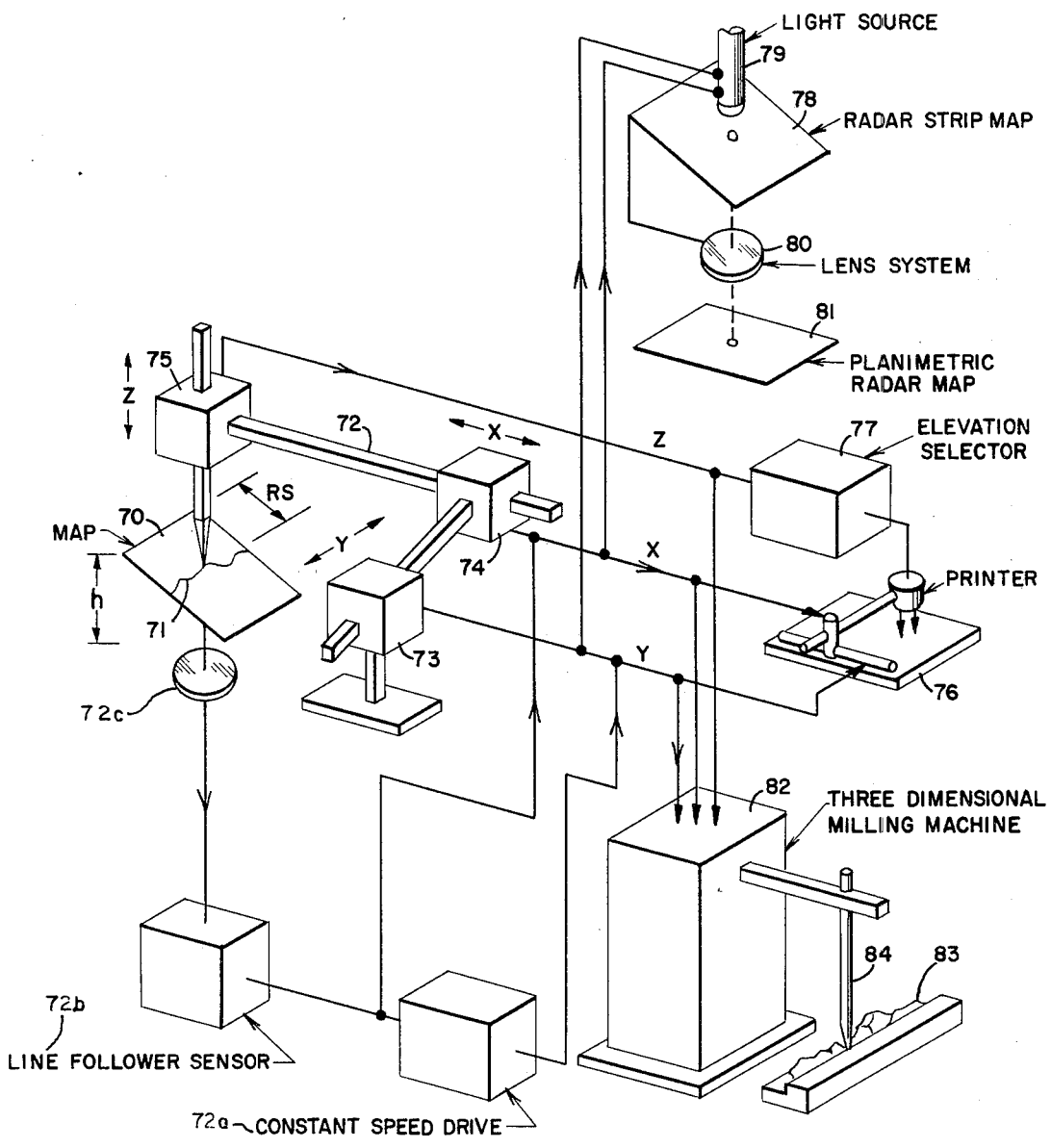
FIG. 7 is a perspective block diagram of the ground equipment utilized for reducing the information received from the airborne system to contour films and relief maps.

The invention favors an analog technique to reduce the equal depression angle contour maps produced by the airborne radar system described above. The technique is based upon the fact that any one angle contour of the data film or map represents the intersection of the plane of equal depression angle with terrain, as illustrated in FIG. 8. Thus, with reference to FIG. 7, if a map 70 containing the angle contour 71 is mounted in an inclined position, making an angle with the horizontal equal to the corresponding depression angle of the radar, the contour line 71 accurately represents a line sample of the physical terrain in a scaled-down space. A line follower, indicated generally by numeral 72, tracing the three-dimensional movement of the contour generates electrical signals in the Y direction indicated by block 73, in the X direction indicated by block 74, and in the Z direction indicated by block 75, which signals correspond to each of the three coordinates for each point along the contour line 71. The line follower 72 is driven in the X and Y directions by a constant speed drive 72a and controlled and held on the contour 71 by an optical line follower sensor 72b wherein the contour 71 is focused onto the sensor 72b by a suitable lens 72c. The X, Y, and Z signals generated thereby are used to perform three separate functions as follows:

1. ELEVATION CONTOUR GENERATION—The long-track and cross-track coordinates are used to control the X and Y positions of an X-Y coordinate plotter 76. The Z signal is fed into an elevation selector 77 which reacts to a number of preselected elevation values, dropping a point on the X-Y plotter 76 and printing the elevation beside it each time one of the preselected elevations occurs. The process is repeated for each angle contour line with a corresponding positioning of the angle contour map 70 for the correct radar depression angle. 2. RADAR STRIP-MAP RESTITUTION—In the airborne system a strip map is made from the beam-sharpened radar signals prior to monopulse sampling, as described previously. This map has the same coordinates as the equal-angle contour record, which are slant range, and distance along track. Therefore, the strip map can be restituted by projecting targets near the equal-angle contours down onto a level plane. This requires that the map, indicated by numeral 78 in FIG. 7, be positioned exactly the same as the contour angle map 70 during readout and that an illumination source 79 be controlled by the X-Y motion of the angle contour line follower 72. This images passes through lens 80 and the resulting restituted map 81 can be combined with the elevation contour map 76 by standard photographic or overlayed techniques.

3. RAISED RELIEF MAP GENERATION—Since the outputs of the three-dimensional line follower 72 correspond to scale-down geometrical coordinates of the physical terrain, they can be fed directly as inputs to a three-dimensional milling or routing machine 82 to produce a raised relief map of the terrain. Any vertical exaggeration desired can be obtained by adjusting the vertical gain. Elevation contours can be produced in a material 83 by prelaminating the material 83 from which the model is cut so that lines of equal elevation are exposed in the cutting process. The size of the cutting head 84 should approximate the resolution of the radar system in the scaled-down spaced, or generally in a range of 0.05 to 0.15 inches. Smoothing the resulting routed or milled map will perform interpolation.

With the present state of developments in components of radar and recording systems, it would not be possible to use the airborne radar records directly in the reduction equipment described heretofore. Thus, the various calibration signals included in the map, as discussed in the airborne equipment section with reference to FIG. 3, would be used to generate a corrected airborne map to be used in the ground-data reduction system. The invention contemplates the original airborne map would be recorded on film. After landing the aircraft, the film would be developed and run through a rescanner whose sweeps would be shaped to correct any inaccuracies in the recording time based. Stabilization deficiency would be corrected with display displacement. The resulting angle contour map, probably recorded on a glass slide, would be used in the process of data reduction as described heretofore.

STABILIZATION AND NAVIGATION

The ideal flight path for terrain-mapping radar is along a great circle at a constant altitude above some datum level. This will provide terrain data most conducive to the generation of a high-fidelity three-dimensional reproduction of the terrain by maintaining the same geometrical conditions between the radar antenna and the field of the targets being illuminated at all positions along the flight path. In this manner the coordinate references could be defined as: 1. Y-axis—the tangent to the great circle in the directon of flight. 2. X-axis—in the horizontal plane, perpendicular to the flight path directed to the right. 3. Z-axis—in the great-circle plane directed upward along the local vertical.

Ideally, of course, the radar antenna must be maintained at a fixed angular attitude relative to this reference coordinate system, and its only translatory motion should be along the Y-axis. Because the antenna is carried aboard an aircraft, any angular rotations the aircraft relative to the reference coordinate system resulting from pitch, roll, yaw, or drift-angle variations will require stabilization. The inertial components 62 and inertial amplifiers and altimeters 63 indicated in FIG. 3a are incorporated to achieve this requirement. The systems are not described in detail, as they do not form a part of the invention, but they are a requirement to achieve reference stability required throughout the flight to insure map accuracy.

SPECIFICATIONS

A plurality of specifications are available in the general systems described heretofore, which may be determined depending on antenna size and maximum strip-width consideration. To keep the antenna as small as possible, a high frequency is required. However, the high frequencies do not have all-weather, to great range capabilities. Therefore a system using a high-frequency small antenna, and producing a narrow strip map, and a system using a lower-frequency large antenna, and producing a wide strip map may set the upper and lower limits on the possibilities available. The invention contemplates that the antennas can vary in size from approximately one times one feet to ten times ten feet with antenna phase center separation of from approximately 0.5 feet to approximately 8 feet, and which will operate at transmitter power varying from approximately 50 kw. to approximately 200 kw. Further, the invention contemplates that the antenna may be carried by an aircraft having velocity capabilities of from between mach 1.0 to mach 2.5 at an altitude of between 20,000 feet to 50,000 feet, to provide terrain elevation mapping data of from zero to 30,000 feet, and a strip-map width of from between 3.0 nautical miles to 15 nautical miles.

RESULTS

Thus, it is seen that the objects of the invention have been achieved by providing an airborne inertially stabilized radar system to provide a strip-map to be used in combination with ground-based equipment to achieve a contour plotted map, or a raised relief map of the terrain beneath the flight path of the aircraft. The airborne system utilizes two vertically spaced fan beam antennas, with monopulse techniques to measure the comparison of phase between pulses received at the two antennas, and a doppler sharpening processing to measure the phase between successive pulses, to conveniently provide informaton to obtain equal-depression-angle contour line maps. The ground-based equipment refines the map data and provides X, Y, and Z coordinate information therefrom to achieve the inputs into the control plotter, and the milling or routing machine to produce the raised relief map. The system is basically automatic, and utilizes well kown radar, electronic, and computing equipment to achieve the desired results.

While in accordance with the Patent Statutes one best known embodiment of the invention has been illustrated and described in detail, it is to be particularly understood that the invention is not limited thereto or thereby, but that the inventive scope is defined in the appended claims.

What is claimed is:

1. In a terrain contour mapping system in an aircraft, the combination of
   a dipole radar antenna consisting of two vertically spaced fan beam antenna poles mounted on the aircraft,
   means to transmit radar signals at a depressed angle from the antenna in directions normal to the flight path of the aircraft,
   means to measure and record the phase difference in the radar signals received at the two poles of the antenna when the signals are reflected from the earth,
   an inertial system to measure and record airborne platform orientation and position,
   means to combine the orientation and position information with the recorded radar information, and
   ground stationed means adapted to receive the combined information to provide a three coordinate output signal which determines points on a map representing the contour of the terrain flown over by the aircraft.

2. In an airborne terrain contour mapping system, the combination of
   an aircraft,
   a radar antenna consisting of two vertically spaced fan beam antenna poles mounted on the aircraft,
   means to transmit thin, pencil-like radar signal at a depressed angle of between 20° to 45° from the antenna at directions normal to the flight path of the aircraft, means to measure and record the phase difference in the radar signals received at the two poles of the antenna when the signals are reflected from the earth, means to effect doppler sharpening to the returning radar signals, an inertial system to measure and record airborne platform orientation and position, means to combine the orientation and position information with the recorded radar information, and ground stationed means adapted to receive the combined information to provide a three coordinate output signal to effect a map of the contour of the terrain flown over by the aircraft.

3. In an airborne terrain contour mapping system, the combination of an aircraft, a radar antenna consisting of two vertically spaced fan beam antenna poles mounted on the aircraft, means to change the vertical separation between the poles of the antenna, means to pulse a radar signal from one pole of the antenna to scan the terrain beneath the aircraft, means to integrate the reflected signal returning to each pole of the antenna, means to effect doppler sharpening techniques to the integrated return signals, amplitude detection means adapted to receive the doppler sharpened integrated signals to provide depression angle information, and CRT display means modulated by the depression angle information to provide a high resolution radar strip map of the area scanned by the antenna.

4. In an airborne terrain contour mapping system, the combination of an aircraft, a dipole radar antenna consisting of two vertically spaced fan beam antenna poles mounted on the aircraft, means to change the vertical separation between the poles of the antenna, means to pulse a radar signal from one pole of the antenna to scan a section of the terrain beneath the aircraft, means to measure the phase difference of the reflected signal returning to each pole of the antenna, means to effect doppler sharpening techniques to the reflected return signals, amplitude detection means adapted to receive the doppler sharpened phase differentiated return signals to provide depression angle information, and CRT display means modulated by the depression angle information to provide a high resolution radar strip map of the area scanned by the antenna.

5. In an airborne terrain mapping system, the combination of an aircraft, a dipole radar antenna consisting of two vertically spaced fan beam antenna poles mounted on the aircraft, means to transmit radar signals at a depressed angle of between 20° to 45° from the antenna in a direction normal to the flight path of the aircraft, means to integrate the returning signals, means to effect doppler sharpening techniques to the returning signals, synchronous demodulator means to detect the phase difference between the reflected returning signals, CRT display and recording means modulated by the phase difference signals from the synchronous demodulator means to provide a high resolution radar strip map of the area scanned by the antenna, delay means to insure proper spacing between successive signals so that the contour lines displayed on the strip map will be sufficiently spaced for reading, means to change the phase relation of the returning signals to provide interpolation between signals, means to place a code base on the returning signals so the relation of the returning signals can be accurately determined, means to place a time base on the returning signals to insure proper linear resolving, inertial stabilization means to provide a smooth and stable flight path for the aircraft, and to provide datum information for the strip map, altitude indicting means to insure the proper altitude for the aircraft's flight path, and ground based resolving equipment adapted to utilize the strip map information which includes a line follower means to obtain three coordinate information from the strip map, means to print a contour map with the information from the line follower means, means to mill a raised relief map with the information from the line follower means, and means to make a photographic contour map utilizing the strip map and the informaton from the line follower means.

6. In an airborne terrain mapping system, the combination of an aircraft, a dipole radar antenna consisting of two vertically spaced fan beam antenna poles mounted on the aircraft, means to transmit radar signals at a depressed angle from the antenna in a direction normal to the flight path of the aircraft, means to effect doppler sharpening techniques to the returned signals, synchronous demodulator means to detect the phase difference between the reflected returning signals, CRT display and recording means modulated by the phase difference signals from the synchronous demodulator means to provide a high resolution radar strip map of the area scanned by the antenna, delay means to insure proper spacing between successive signals so that the contour lines displayed on the strip map will be sufficiently spaced for reading, means to change the phase relation of the returning signals to provide interpolation between signals, means to place a code base on the returning signals so the relation of the returning signals can be accurately determined, means to place a time base on the returning signals to insure proper linear resolving, inertial stabilization means to provide a smooth and stable flight path for the aircraft, and to provide datum information for the strip map, altitude indicating means to insure the proper altitude for the aircraft's flight path, and ground based resolving equipment adapted to utilize the strip map information which includes a line follower means to obtain three coordinate information from the strip map, means to print a contour map with the information from the line follower means, means to mill a raised relief map with the informaton from the line follower means, and means to make a photographic contour map utilizing the strip map and the information from the line follower means.

7. In an airborne terrain mapping system, the combination of an aircraft, a dipole radar antenna consisting of two vertically spaced fan beam antenna poles mounted on the aircraft, means to transmit radar signals at a depressed angle from the antenna in a direction normal to the flight path of the aircraft, means to effect doppler sharpening techniques to the returned signals, synchronous demodulator means to detect the phase difference between the reflected returning signals, CRT display and recording means modulated by the phase difference signals from the synchronous demodulator means to provide a high resolution radar strip map of the area scanned by the antenna, inertial stabilization means to provide a smooth and stable flight path for the aircraft and to provide datum information for the strip map, altitude indicating means to insure the proper altitude for the aircraft's flight path, and ground based resolving equipment adapted to utilize the strip map informaton to provide a raised relief map and a printed contour map.

8. In a terrain contour mapping system, the combination of an aircraft, an antenna system mounted on the aircraft, means to transmit radar signals at a depressed angle from the antenna in directions normal to the flight path of the aircraft, means to measure and record the terrain information received at the antenna from the reflected radar signals, an inertial stabilization system mounted on the aircraft to provide a stable platform for the antenna, and to record datum information, and ground based data processing equipment adapted to receive the recorded radar and datum informaton and to generate three coordinate information, and means adapted to receive the three coordinate information from the ground based processing equipment to provide a contoured relief map, and a raised relief map of the terrain flown over by the aircraft.

9. In a terrain contour mapping system, the combination of an aircraft, a dipole antenna system consisting of two vertically spaced fan beam antenna poles mounted on the aircraft, means to transmit radar signals at a depressed angle from one pole of the antenna in directions normal to the flight path of the aircraft, means to measure and record the phase difference of the returning terrain information received at the poles of the antenna from the reflected radar signals, an inertial stabilization system mounted on the aircraft to provide a stable platform for the antenna, and to record datum information, ground based data processing equipment adapted to receive the recorded radar and datum information and to generate three coordinate information, and means adapted to receive the three coordinate information from the ground based processing equipment to provide a contoured relief map, and a raised relief map of the terrain flown over by the aircraft.

* * * * *